(12) United States Patent
Ranner et al.

(10) Patent No.: US 9,734,342 B2
(45) Date of Patent: *Aug. 15, 2017

(54) METHOD AND DEVICE FOR SUPPLYING OF A DATA SET STORED IN A DATABASE

(71) Applicant: SONY DADC AUSTRIA AG, Anif (AT)

(72) Inventors: Gerfried Ranner, Freilassing (DE); Reinhard Blaukovitsch, Elixhausen (AT)

(73) Assignee: SONY DADC AUSTRIA AG, Anif (AT)

( * ) Notice: Subject to any disclaimer, the term of this patent is extended or adjusted under 35 U.S.C. 154(b) by 6 days.

This patent is subject to a terminal disclaimer.

(21) Appl. No.: 14/329,576

(22) Filed: Jul. 11, 2014

(65) Prior Publication Data

US 2014/0325675 A1    Oct. 30, 2014

Related U.S. Application Data

(63) Continuation of application No. 12/792,563, filed on Jun. 2, 2010, now Pat. No. 8,781,120, which is a (Continued)

(30) Foreign Application Priority Data

Feb. 14, 2002    (EP) .................................... 02003465

(51) Int. Cl.
*G06F 7/04*    (2006.01)
*G06F 21/60*    (2013.01)
(Continued)

(52) U.S. Cl.
CPC .............. *G06F 21/60* (2013.01); *G11B 19/04* (2013.01); *G11B 19/12* (2013.01); *G11B 20/00086* (2013.01)

(58) Field of Classification Search
CPC ......... G06F 21/60; G11B 19/04; G11B 19/12; G11B 20/00086
(Continued)

(56) References Cited

U.S. PATENT DOCUMENTS 5,784,460 A    7/1998  Blumenthal et al.
5,982,888 A *  11/1999 Luckeneder ....... G07C 9/00857
                                                        380/52

(Continued)

FOREIGN PATENT DOCUMENTS

EP    1 069 570    1/2001
JP    7-296508    11/1995
(Continued)

OTHER PUBLICATIONS

Japanese Office Action issued on Mar. 22, 2011 in corresponding Japanese Application No. 2003-568652 filed on Feb. 12, 2003 (English Translation Only).

*Primary Examiner* — Samson Lemma
(74) *Attorney, Agent, or Firm* — Oblon, McClelland, Maier & Neustadt, L.L.P.

(57) ABSTRACT

Method and device for supplying of a data set stored in a database to supply of a data set, e.g. the content of a copy protected audio CD, which is stored in a database, e.g. to a user PC on which said content of a copy protected audio CD cannot be accessed, the following steps are performed: receiving a serial code of a set of serial codes assigned to said data set, verifying of said received serial code, in case of a positive verification, accessing said data set correspond to said received and positively verified serial code from said database and outputting of at least parts of said accessed data.

22 Claims, 1 Drawing Sheet

Related U.S. Application Data continuation of application No. 10/504,342, filed as application No. PCT/EP03/01384 on Feb. 12, 2003, now Pat. No. 7,751,562.

(51) Int. Cl.
  *G11B 19/04* (2006.01)
  *G11B 19/12* (2006.01)
  *G11B 20/00* (2006.01)

(58) Field of Classification Search
  USPC ...... 726/26–27; 380/201, 231, 230; 713/193
  See application file for complete search history.

(56) References Cited

U.S. PATENT DOCUMENTS

| | | | |
|---|---|---|---|
| 6,505,160 B1* | 1/2003 | Levy et al. | 704/270 |
| 7,047,302 B1 | 5/2006 | Chatani et al. | |
| 7,360,252 B1 | 4/2008 | Torrubia-Saez | |
| 2002/0103855 A1* | 8/2002 | Chatani | 709/203 |
| 2002/0112172 A1* | 8/2002 | Simmons | 713/193 |
| 2004/0128145 A1 | 7/2004 | Sato | |
| 2005/0033864 A1 | 2/2005 | Matsushima et al. | |
| 2005/0039032 A1* | 2/2005 | Babowicz | G06F 21/10 |
| | | | 713/193 |
| 2006/0143268 A1* | 6/2006 | Chatani | 709/203 |
| 2006/0218645 A1 | 9/2006 | Newman | |
| 2006/0242315 A1* | 10/2006 | Nichols | 709/231 |
| 2007/0078989 A1 | 4/2007 | Van Datta et al. | |
| 2007/0112686 A1* | 5/2007 | Chatani et al. | 705/64 |

FOREIGN PATENT DOCUMENTS

| | | |
|---|---|---|
| JP | 10-198571 A | 7/1998 |
| JP | 2001-222643 | 8/2001 |
| WO | WO 96 29639 | 9/1996 |
| WO | WO 9629639 A2 | 9/1996 |
| WO | WO 02/11036 | 2/2002 |

\* cited by examiner

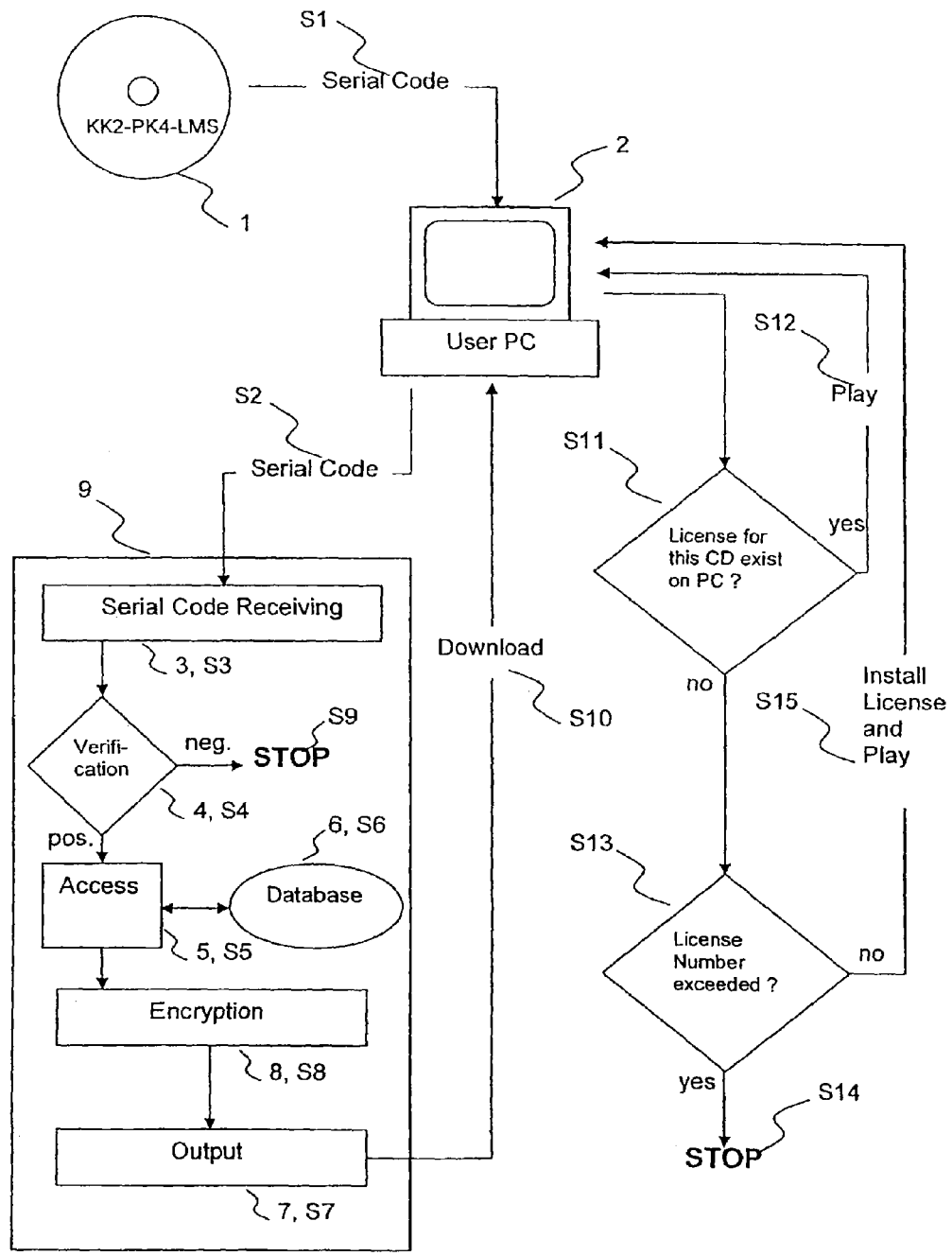

METHOD AND DEVICE FOR SUPPLYING OF A DATA SET STORED IN A DATABASE

CROSS-REFERENCE TO RELATED APPLICATIONS

This application is a continuation Application of, and claims the benefit of priority under 35 U.S.C. §120 from, U.S. application Ser. No. 12/792,563, filed on Jun. 2, 2010 herein incorporated by reference, which is a continuation Application of, and claims the benefit of priority under 35 U.S.C. §120 from, U.S. application Ser. No. 10/504,342, filed Aug. 12, 2004, now granted as U.S. Pat. No. 7,751,562, issued on Jul. 6, 2010, herein incorporated by reference, which is a National Stage Application of International Application No. PCT/EP03/01384, filed Feb. 12, 2003.

The present invention relates to a method for supplying of a data set stored in a database and a corresponding data set supplying device as well as a data carrier relating to said method and device.

In particular, the present invention relates to a method for supplying of a data set via a database, which data set is normally stored and distributed to users on a copy protected data carrier, e. g. the audio data stored on a copy protected audio compact disc (CD) or the audio/video data stored on a copy protected digital versatile disc (DVD).

Most modern personal computers are already well-equipped with recording hard and software which makes it easy to record music and/or video on compact disc recordables (CD-R) or digital versatile disc recordables (DVD-R). Within the last couple of years the number of copies made from a single sound carrier tremendously increased. Therefore, the music and video industry found different solutions to protect their audio and video CDs and DVDs from illegal duplication and copy right infringement.

These copy protection solutions normally allow to play copy protected record carriers on CD-audio players, car hi-fi systems, game consoles, like Play Station™ and PS2™, DVD-players and SACD players. However, the special signatures used prevent playback and a copying on personal computers and thus offer high robustness on copy protection. The special signature might be designed to not change a single bit in the audio and/or video data stream to protect the quality of the original recording by the artist and to comply with the respective standards, e.g. the Red-Book for CDs, which do not allow built-in uncorrectable errors.

However, due to the fact that such copy protected CDs or DVDs cannot be played back on a PC, customers who purchased such record carriers feel restricted in their playback possibilities due to not being able to use these record media on their personal computers of laptops.

Therefore, it is the object underlying the present invention to provide such a content, i.e. data set, so that a user is able to install it on a personal computer or laptop which is not able to read the copy protected record media.

This object is solved by a method for supplying of a data set stored in a database according to the present invention as defined in independent claim 1, a data set supplying device according to the present invention as defined in independent claim 21, and a data carrier according to the present invention as defined in independent claim 34. Preferred. embodiments thereof are respectively defined in the respective following sub claims. A computer program product according to the present invention is defined in claim 19 and a storage medium storing a computer program product according to the present invention is defined in claim 20.

The key feature of the present invention is that every data set, e. g. content of an audio CD or a DVD, gets at least one serial code assigned with which after verification said data set might be supplied from a database to a customer. Therewith, according to the present invention an individual copy protected audio CD might be supplied with an individual serial code, normally a unique alphanumeric number on the record carrier, inside or on back of the booklet supplied together with the CD, with which serial code the content of the particular audio CD might be downloaded to the personal computer of a user, since the serial code comprises a pointer functionality to said particular data set by the assignment thereto. The database might additionally be secured with an access restriction, such as a password, etc. The key might also be stored as data on the record carrier in which case an automatic access, e.g. streaming or download, of the corresponding data after insertion of the respective CD into a correspondingly designed CD player or a computer, such as a PC or laptop, will be possible. A data set in the sense of the present invention might be the complete audio content of a CD or the complete audio/video content of a DVD, i.e. a fixed amount of data representing a predetermined content of a storage medium.

The method for supplying of a data set stored in a database according to the present invention comprises the following steps:

receiving a serial code of a set of serial codes assigned to said data set, verifying of said received serial code, in case of a positive verification, accessing said data set corresponding to said received and positively verified serial code from said database, and outputting of at least parts of said accessed data set.

Corresponding thereto, a data set supplying device, comprising a database for storing data sets, according to the present invention comprises the following additional means:

a serial code receiving means for receiving a serial code of a set of serial codes assigned to said data set, a verification means for verifying of said received serial code, an accessing means for, in case of a positive verification, accessing said data set corresponding to said received and positively verified serial code from said database, and an output means for outputting of at least parts of said accessed data set.

Finally, a data carrier, comprising a copy protection for a data set stored on said data carrier, according to the present invention comprises a serialization associated to said data set stored on said data carrier.

Therewith, according to the present invention, a unique serial code might be associated to only one individual record carrier, i.e. assigned to a data set stored on said individual record carrier. All other record carriers of the same type, i.e. storing the same data set, might have a respective other serial code of the set of serial codes assigned, which set of serial codes might be assigned to all or a predetermined part of all record carriers of the same type. In other words, a customer buying a copy protected audio CD might receive a unique serial code with the audio CD, which serial code is assigned to the audio data recorded on the CD. Another customer, buying another copy protected audio CD with the same content might receive another serial code associated to the same audio data. Having a serial code, the customer might download the associated data set, e.g. the whole audio content of the CD, or selected parts thereof, e.g. only selected tracks. It is also possible that additional data, e.g.

bonus tracks which are not included on the record carrier, e.g. the audio CD, are additionally accessible for the user. This additional access might have an extra limitation, e.g. to the first access or to a predetermined access type (e.g. streaming or download).

Further, after a data set supplying device according to the present invention, e.g. an internet server, received such a serial code, e.g. through a user interface, a verification is performed and in case the serial code is positively verified, the corresponding data set, i.e. the audio data to which the serial code is assigned, is output to the user.

It is possible to log the procedure and to supply the corresponding data set only a predetermined amount of times, e.g. once. Also, a distinction between download, i.e. storing of the supplied data set on the user side, and streaming, i.e. only output, but no storing of the supplied data set on the user side, could be made so that streaming might be always allowed whereas download might only be allowed a predetermined amount of times, e.g. once. In such a case a data set supplying device according to the present invention would additionally comprise a logging means for monitoring the use of a serial code and restricting the access to the corresponding data set, e.g. by affecting the verification.

In a preferred embodiment of the method according to the present invention, an encryption of said data set with a digital right management encryption is performed, e.g. after said data set is accessed and before it is output.

Correspondingly, a data set supplying device according to this preferred embodiment of the present invention additionally comprises an encryption means for encryption of said data set with a digital right management encryption after said data set is accessed and before it is output.

In this case, said digital right management encryption might be based on the serial code assigned to said data set.

As will be further elucidated below, the digital right management encryption is a system according to which it is secured that data which is installed or copied on a PC can only be properly accessed with an decryption key which is only supplied a predetermined amount of times, e.g. once. In other words, the content of an audio CD downloaded on a user PC also which received the proper decryption key can only be played back on said particular user PC, if the decryption key is not supplied to another user PC which also received the downloaded audio data.

In the method and/or for the data set supplying device according to the present invention a user who wants to receive said data set stored in said database might obtain said serial code after a contract about the rights to use said data set is made with the supplier of said data set.

Alternatively or additionally, in the method and/or for the data set supplying device according to the present invention a user who wants to receive said data set stored in said database might obtain said serial code when purchasing said data set on a data carrier.

In the latter case, said serial code might be an unique serial code which is assigned to only one data carrier storing said data set and said set of serial codes are all serial codes assigned to all or a predetermined part of all data carriers storing the same data set.

In the latter case, alternatively or additionally, said serial code might be stored as data on said data carrier.

In the latter case, further alternatively or additionally, said serial code might be associated to said data carrier by being supplied on a case of said data carrier and/or on a written description delivered with said data carrier.

In the latter case, still further alternatively or additionally, said data carrier might be protected against copying said data set from said data carrier.

In the method according to the present invention said step of verifying of said received serial code might comprise the step of:
determining a positive verification in case said serial code is valid in terms of general rules for the structure of a serial code.

In the method according to the present invention said step of verifying of said received serial code might alternatively or additionally comprise the step of:
determining a positive verification in case said data set should be downloaded and said serial code is not disabled for the data retrieval, In the method according to the present invention a serial code might get disabled for the data retrieval in case the associated data set was output a first predetermined amount of times as download.

Alternatively or additionally, in the method according to the present invention a serial code might get disabled for the data retrieval in case the associated data set was output a second predetermined amount of times as streaming.

Correspondingly, in a data set supplying device according to the present invention these verifying and/or disabling steps might be performed by said verification means.

In the method according to the present invention said database might be remotely accessible.

In the method according to the present invention said database might be accessible via the internet or any other network.

Correspondingly, a data set supplying device according to the present invention might be remotely accessible, e.g. via the internet or any other network. As set out above, the data set supplying device according to the present invention might be realized as internet server.

In the method and/or for the data set supplying device according to the present invention said serial code might comprise an alphanumeric code with a predetermined number of digits.

Alternatively or additionally, in the method and/or for the data set supplying device according to the present invention said serial code might comprise a computer readable code, e.g. a barcode.

In the method and/or for the data set supplying device according to the present invention said data set might comprise video and/or audio data.

A computer program product according to the present invention comprises computer program means adapted to perform the method steps as elucidated above when being executed on a computer, digital signal processor, or the like.

A storage medium according to the present invention stores a computer program product according to the present invention.

A data carrier according to the present invention might be not readable by a computer.

Alternatively or additionally, a data carrier according to the present invention might be a CD or a DVD.

Further objects, features and advantages of the method, the device and the data carrier according to the present invention are elucidated in the following on basis of an exemplary embodiment according to the present invention in connection with the accompanying FIG. 1 which shows a sequence diagram elucidating the method, device and record carrier according to an illustrative embodiment of the present invention to offer a customer the possibility to transfer the content of a purchased copy protected record carrier to a personal computer.

The illustrative preferred embodiment described in the following is an audio copy control system which is designed to fight domestic piracy by preventing CD to CD-R copying. The main benefits of the here applied copy protection scheme which is disclosed in the Applicant's PCT-Patent Application PCT/EP01/02633 which is herewith incorporated by reference into this Application is highest copy protection efficiency together with full compatibility with the existing audio CD players, car hi-fi-systems, DVD video players, SuperAudio CD players, and game consoles such as PlayStation™ and PlayStation 2™ consoles.

Extensive testing regarding the efficiency of the system provided that 90% of the CD-ROM/DVD drives judge the protected CD as not readable and therefore the audio CD can neither be copied nor ripped. On the other hand, the audio part fully complies with the Red Book standard, i. e. not a single bit is changed in the audio data stream which means that no uncorrectable errors are used to protect the audio data. This gives the highest audio quality for the protected music.

Further, the method, device and record carrier according to the present invention provide a full playability of the data recorded on the copy protected record carrier on a computer via an internet download or streaming solution which is—in a preferred embodiment—again secured against unauthorized copying by way of a digital rights management, as described in the following in connection with FIG. 1.

A data carrier according to the present invention, such as an audio CD 1 which comprises a copy protection for the audio data which is stored thereon, comprises a serialization associated to said audio data stored thereon. In the shown example the serialization is a unique serial code, i. e. a serial code which is only once associated to said particular audio data on said particular audio CD. In other words, also another audio CD comprising the same audio data does not have the same serial code. The serial code in FIG. 1 is a 9 digit code which is divided in three packets of three digits and which reads KK2-PK4-LMS.

In case a user wants to transfer the audio data comprised on the audio CD 1 to a user PC 2, the serial code KK2-PK4-LMS associated to the particular audio data on the particular audio CD 1 has to be entered in a step S1 to the user PC 2, e.g. within an internet browser. Thereafter, the serial code is transferred from the user PC 2 to a data set supplying device 9 according to the present invention, e.g. an internet server, in a step S2.

The data set supplying device 9 receives said serial code in a step S3 with a serial code receiving means 3. The serial code might be one of a set of serial codes assigned to said particular audio data, wherein each particular audio CD storing said particular audio data has a different unique serial code and all serial codes or a particular part of all serial codes associated to the same audio data, but to different audio CDs, built the set of serial codes.

The serial code received in step S3 gets verified in a step S4 by a verification means 4. In case the verification is negative, i. e. the serial code is invalid, the process proceeds to a step S9 and stops. This means, the audio data is not transferred to the user, since the serial code entered in step S1 and transferred to the data set supplying device 9 in step S2 was invalid.

Invalidity of a serial code might be given in case of a wrong serial code structure, e.g. a different number of digits, a not assigned serial code, a already disabled serial code, an infringement of serial code design rules, etc.

In case the verification result is positive, the process proceeds with a step S5 in which an accessing means 5 accesses a database 6 which supplies the requested audio data in a step S6 to the accessing means 5. The accessed data is passed on to an output means 7 which outputs the audio data corresponding to the input serial code in a step S7. In the preferred embodiment an encryption of the accessed data is performed in a step S8 by an encryption means 8 after said data is accessed and before it is output.

The output data is transferred to the user PC 2 as a download in step S10. Alternatively, the output data could be supplied to the user PC 2 as a streaming in which case an encryption of the accessed data might be not necessary depending on the music player installed on the user PC 2 which is used for reproducing the streamed audio data.

In case the user wants to reproduce the downloaded audio data with the user PC 2, the digital right management system which is explained in the following ensures that no unauthorized copying and distribution of the transferred audio data is performed. When a request for playing the music corresponding to the downloaded audio data is issued from the user to the playback program installed within the user PC 2 this program looks for a decryption key to decrypt the encrypted and downloaded audio data in a step S11. This decryption key corresponds to the license to play the corresponding audio data on the particular user PC 2. In case the encryption key exists on the user PC 2 the audio data is played in step S12.

In case no encryption key for the particular audio data exists on the user PC 2 a request is issued to a digital rights management server to provide the encryption key. This request might be issued via the internet. The digital rights management server checks in a step S13 whether a license number for this particular audio data might be issued or not. For example, for an audio CD only one license number might be issued.

In case it is still possible to issue the license number, e.g. no license number was issued before, it is transferred to the user PC 2, installed thereon and the audio data are played back in step S15. In case the limit of license numbers to be issued for the particular audio data is reached, the process stops in step S14 and no license number is installed on the user PC 2. In this case no playback of the audio data would be possible with the user PC 2.

The digital rights management server might be included within the data set supplying device 9, e.g. within the same internet portal or on the same internet server.

The described Online Solution according to the present invention enables CD-owners to download or stream the music tracks which are on the copy protected audio CD.

The system can also be integrated in artists' web sites seamlessly—so it does not have to be seen as a special music portal.

In order to prevent file sharing with online music exchange portals or the like, the music files are in general supplied with the described copy protection system.

Each copy protected CD according to the present invention is supplied with a serial code, e.g. an unique alphanumeric number inside or on the back of the booklets. The serial code might consist of 9-digit combination of numbers and characters which is different for every CD.

The buyer of a copy protected CD can download or stream the respective music tracks from artist's web site or a special music portal after entering this code.

The serial code is checked for its validity and the procedure might be logged. Thus the origin of this copy protected CD is theoretically retraceable down to the production process.

The described Online Solution offers the tracks for tethered download or streaming.

When downloading, the music file is transmitted once to the customer's hard disk and can be played back from there after the download is completed. The digital rights management system, e.g. the described online copy protection system, ensures that music files are unusable for third parties or illegitimate users.

When streaming the music files are (in contrast to the download) not stored on the customers hard disk. The data stream is not recorded but directly played back by the computer. The advantage of this method is that music can be played back from the very first second of the transmission.

Streaming does not currently play a major role in the internet compared to download, but it is becoming more and more important with the increasing use of flat rates and broad band internet.

Another advantage of streaming is its ability to adapt itself to the speed of the customers internet connection (sure stream). Thus, even users with a very slow internet connection are able to stream music files without any interruption although with a lower audio quality).

In general, any available file formats for streaming or downloading can be used with this system, e. g. Windows Media™ and Real Audio™.

Windows Media™ is similar to MP3, but comes with a higher compression rate and above all with an integrated digital rights standard. Real Media™ is the most common streaming solution at the present time.

Both formats offer good audio quality with low bandwidth requirements and can be used with Apple MAC and PC MS-Windows systems.

The Microsoft Windows Media Player™ can be used for streaming and download. It can be used with MAC or Microsoft operating systems.

The Real Player™ is used for streaming the music files. It can be used with MAC or Microsoft operating systems.

The described Online Solution shall be understood as a supplement of the above referenced audio copy protection system. Therefore, security and copy protection of the offered music files have highest priority.

In addition to the validation of the serial codes, the preferred embodiment including the Digital Rights Management of the music files plays a central role. The function of these two mechanisms in context with the music is explained below:

LAYER 1: The Serial Code

In a central security database each audio disc is associated with a serial code. This code might be a 9-digit alpha numerical combination which does not contain the numbers [0] and [1] and the characters numbers [0] and [I] in order to ensure good legibility. Accordingly more than 35 Trillions of combinations are available.

Example for Serial Code: KK2-PK4-LMS

When the user has entered his serial code into the music portal, the code is verified and if it is valid the tracks of the corresponding CD are offered for tethered download or streaming.

LAYER 2: Digital Rights Management

Whenever a download is requested by a user, the music file is encrypted with individual parameters and supplied with digital rights. Such an encrypted file cannot be played back until a proper key is installed on the user's computer.

Such a key is an encrypted file with few kB memory space, which is integrated into the operating system of the consumer's PC.

When the music file is played back for the very first time, usually immediately after the download, the installed player contacts the key server, which determines the rights to be issued from the security database. The publisher can define different rights in the Digital Rights Management—such as access rights per title, per individual music track—or even expiration date on usage.

Based on the information contained by the encrypted music file and the rights set in the security database, a key is generated and sent to the installed player of the user. This key is implemented into the operating system of the user.

The complete Rights Management procedure happens fairly imperceptible for the user and is finished within a couple of seconds.

Once there is a key installed for the respective music file, there is no connection to the key server required any more. Thus, after a music file has been installed with its proper key, it can be played back offline any time.

As the key is associated with the computer's internal data, it cannot be copied. Therefore, the music file will not play on another computer if passed on. A further key will only be issued if this is permitted by the publisher—for example to three PCs (Home PC, Office PC and Laptop).

With the described music portal i. e. data set supplying device 9, the issued keys are in general valid for all tracks of a CD. Thus, if a key has been installed on a computer, each online track of this CD can be played back immediate offline without requiring a separate key.

The most important specification of this copy protection system is that the music file cannot be passed on. There are a number of further features which allow to specify the rights of a music file more precisely.

The following list outlines some of the most important digital rights possibilities without going to much into detail:
  Date limitation of the possibility to play back:
    works offline, file is locked when the system clock is set to a previous date.
  Limitation of the number of play backs:
    works offline
  The right to copy the file to a portable player.
  Limitation of the number of copies to portable players.

A further application area are pre-releases for radio stations. Such pre-releases can be protected with the Digital Rights Management system. The protected pre-releases can either be published on CD-R or provided for download in combination with the serial code, e.g. the unique 9-digit code. The publisher is able to specify a start-date and an expiration date or a maximum number of uses, for example.

Therefore, music releases can be distributed simultaneously to different radio stations, thus giving them the possibility to have different release dates. With the described mechanism the publisher is able to control the date of release by the minute for each radio station separately.

As mentioned above, because of the serial code serial code supplied with the CD or DVD, only customers who have purchased the CD or DVD have access to the online files. As a future opinion, a combination with an online shop for purchasing a serial code can be established. This will enable customers to buy music download without having bought the CD or DVD. Of course, also all other storage media are applicable to the present invention.

An illegal user might be able to download the music files with a illegally obtained serial code. But when he tries to play back one of the downloaded songs, the system recognizes that the key for these files has already been issued to another user and refuses to play back the files.

Even streaming of music files can be furnished with a digital rights management in order to refuse streaming with shared serial codes.

The invention claimed is:

1. A method for supplying duplicate version(s) of at least parts of data content using a data set supplying device including a processor, the duplicate version(s) representing data content stored on a copy-protected data carrier, the method comprising:
receiving a serial code assigned to the copy-protected data carrier from a remote computer, via a network, by the data set supplying device, the data set supplying device containing at least one data set, a set of serial codes being assigned to each respective data set;
verifying the serial code supplied to the data set supplying device;
accessing a data set of the data set supplying device, the data set corresponding to the data content stored on the copy-protected data carrier in that the data set is a duplicate version of the data content stored on the copy-protected data carrier and corresponding to the serial code in dependence on a positive verification of the serial code supplied; and
supplying, using the data set supplying device, at least parts of the accessed data set to the remote computer via the network as a one-time download, wherein
any of the supplying of at least parts of the accessed data set is limited to only the one-time download, and
the serial code is a unique serial code which is assigned to only one data carrier storing the data set and the set of serial codes are all serial codes assigned to all or a predetermined part of all data carriers storing the same data set.

2. The method according to claim 1, wherein a user who wants to receive the data set obtains the serial code after a contract about the rights to use the data set is made with the supplier of the data set.

3. The method according to claim 1, wherein a user who wants to receive the data set obtains the serial code when purchasing the data set on a data carrier.

4. The method according to claim 3, wherein the serial code is stored as data on the data carrier.

5. The method according to claim 3, wherein the serial code is associated to the data carrier by being supplied on at least one of a case of the data carrier and a written description delivered with the data carrier.

6. The method according to claim 1, wherein the verifying of the serial code comprises determining a positive verification in case the serial code is valid in terms of general rules for structure of a serial code.

7. The method according to claim 1, wherein the verifying of the serial code comprises determining a positive verification in case the data set should be downloaded and the serial code is not disabled for the data retrieval.

8. The method according to claim 1, wherein the serial code comprises an alphanumeric code with a predetermined number of digits.

9. The method according to claim 1, wherein the serial code comprises a computer readable code.

10. The method according to claim 1, wherein the data set comprises at least one of video data and audio data.

11. A non-transitory computer-readable storage medium including computer executable instructions, wherein the instructions, when executed by a computer that outputs duplicate version(s) of at least parts of content, the duplicate version(s) representing data content being stored on a copy protected data carrier, cause the computer to perform a method, the method comprising:
receiving a serial code assigned to the copy-protected data carrier from a remote computer via a network, the serial code also being part of a set of serial codes assigned to a data set;
verifying the received serial code;
accessing, in dependence on a positive verification of the received serial code, a data set corresponding to the data content stored on the copy-protected data carrier in that the data set is a duplicate version of the data content stored on the copy-protected data carrier; and
outputting at least parts of the accessed data set to the remote computer via the network as a one-time download, wherein
any of the outputting of at least parts of the accessed data set is limited to only the one-time download, and
the serial code is a unique serial code which is assigned to only one data carrier storing the data set and the set of serial codes are all serial codes assigned to all or a predetermined part of all data carriers storing the same data.

12. A data set supplying device that outputs duplicate version(s) of at least parts of content, the duplicate version(s) representing data content being stored on a copy protected data carrier, the data set supplying device comprising:
processing circuitry configured to
receive a serial code assigned to the copy-protected data carrier from a remote computer via a network, the serial code also being part of a set of serial codes assigned to a data set,
verify the received serial code,
access, in dependence on a positive verification of the received serial code, a data set corresponding to the data content stored on the copy-protected data carrier in that the data set is a duplicate version of the data content stored on the copy-protected data carrier, and
output at least parts of the accessed data set to the remote computer via the network as a one-time download, wherein
any of the outputting of at least parts of the accessed data set is limited to only the one-time download, and
the serial code is a unique serial code which is assigned to only one data carrier storing the data set and the set of serial codes are all serial codes assigned to all or a predetermined part of all data carriers storing the same data.

13. The data set supplying device according to claim 12, wherein the processing circuitry is further configured to encrypt the data set with a digital right management encryption after the data set is accessed and before the data set is output.

14. The data set supplying device according to claim 13, wherein the digital right management encryption is based on the serial code assigned to the data.

15. The data set supplying device according to claim 12, wherein the processing circuitry is further configured to determine a positive verification in case the serial code is valid in terms of general rules for structure of a serial code.

16. The data set supplying device according to claim 12, wherein the processing circuitry is further configured to determine a positive verification in case the data set should be downloaded and the serial code is not disabled for the data retrieval.

17. The data set supplying device according to any claim 12, wherein the serial code comprises an alphanumic code with a predetermined number of digits.

18. The data set supplying device according to claim 12, wherein the serial code comprises a computer readable code.

19. The data set supplying device according to claim 12, wherein the data set comprises video and/or audio data.

20. The method according to claim 1, wherein the data content stored on the copy-protected data carrier is initially unreadable by the remote computer.

21. The method according to claim 1, wherein the data set comprises at least one of video data and audio data, and the at least one of video data and audio data is a full duplicate version of an entirety of the data content stored on the copy-protected data carrier.

22. The method according to claim 1, wherein
the serial code is associated to the copy-protected data carrier by being supplied on at least one of a case of the copy-protected data carrier and a written description delivered with the copy-protected data carrier, the serial code being input via a user interface.

* * * * *